(12) United States Patent
Mukaiyama

(10) Patent No.: US 10,498,915 B2
(45) Date of Patent: Dec. 3, 2019

(54) ELECTRONIC DEVICE, IMAGE FORMING DEVICE, CONTROL METHOD FOR ELECTRONIC DEVICE, AND PROGRAM

(71) Applicant: SHARP KABUSHIKI KAISHA, Sakai, Osaka (JP)

(72) Inventor: Daisuke Mukaiyama, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 16/199,205

(22) Filed: Nov. 25, 2018

(65) Prior Publication Data

US 2019/0166269 A1    May 30, 2019

(30) Foreign Application Priority Data

Nov. 27, 2017    (JP) .................................. 2017-226614

(51) Int. Cl.
    *H04N 1/00*    (2006.01)
(52) U.S. Cl.
    CPC ..... *H04N 1/00649* (2013.01); *H04N 1/00575* (2013.01); *H04N 1/00588* (2013.01); *H04N 1/00602* (2013.01)
(58) Field of Classification Search
    CPC .......... G03G 15/5016; H04N 1/00103; H04N 1/00315; H04N 1/0035; H04N 1/00384; G06F 3/0237; G06F 3/04842; G06F 3/04886
    USPC ................................................ 345/173, 168
    See application file for complete search history.

(56) References Cited

U.S. PATENT DOCUMENTS

| | | | | |
|---|---|---|---|---|
| 7,634,186 B2* | 12/2009 | Nojima | ................... | G03B 13/36 396/103 |
| 8,013,922 B2* | 9/2011 | Isoyama | ............ | H04N 5/23293 345/650 |
| 8,998,564 B2* | 4/2015 | Lemmers, Jr. | .......... | F01D 5/026 415/116 |
| 9,699,336 B2* | 7/2017 | Koga | .................... | H04N 1/0035 |
| 10,033,890 B2* | 7/2018 | Hanada | ................ | G03G 15/502 |
| 2005/0225540 A1* | 10/2005 | Kawakami | .......... | G06F 3/04842 345/173 |
| 2014/0268221 A1* | 9/2014 | Sako | ................... | H04N 1/00204 358/1.15 |
| 2015/0181050 A1* | 6/2015 | Nishii | ................ | H04N 1/00307 358/1.15 |

(Continued)

FOREIGN PATENT DOCUMENTS

JP    2016-076962 A    5/2016

*Primary Examiner* — Negussie Worku
(74) *Attorney, Agent, or Firm* — ScienBiziP, P.C.

(57) ABSTRACT

An electronic device is provided with an operation panel, a communication unit, and a processing unit. The operation panel has a first operation key and a second operation key within a specific region. The communication unit is arranged within the specific region of the operation panel, and is a location for communicating wirelessly with a mobile terminal that is in a state opposing the specific region. The processing unit determines whether an operation result of the second operation key is valid or invalid on the basis of operations of the first operation key and the second operation key in such a way that the operation result of the second operation key is invalidated in a case where the first operation key has been operated.

12 Claims, 13 Drawing Sheets

(56) References Cited

U.S. PATENT DOCUMENTS

| | | | |
|---|---|---|---|
| 2015/0229690 A1* | 8/2015 | Raesig | H04N 21/42204 709/219 |
| 2017/0017184 A1* | 1/2017 | Yamada | G03G 15/5016 |
| 2018/0007231 A1* | 1/2018 | Ando | H04W 4/80 |
| 2019/0028894 A1* | 1/2019 | Yokoyama | H04W 12/06 |
| 2019/0114128 A1* | 4/2019 | Nagahara | G06F 3/1287 |

* cited by examiner

ELECTRONIC DEVICE, IMAGE FORMING DEVICE, CONTROL METHOD FOR ELECTRONIC DEVICE, AND PROGRAM

BACKGROUND

1. Field

The present disclosure relates to an electronic device, an image forming device, a control method for the electronic device, and a program.

2. Description of the Related Art

In electronic devices such as image forming devices including multifunction peripherals (MFP), for example, devices provided with an operation panel for receiving user operations are conventionally known (Japanese Unexamined Patent Application Publication No. 2016-76962, for example).

In Japanese Unexamined Patent Application Publication No. 2016-76962, an electronic device (multifunction peripheral) is provided with a communication unit (wireless communication unit) that communicates wirelessly with a mobile terminal (a smartphone or the like) in such a way that the electronic device can be operated by means of the mobile terminal. The communication unit uses near field communication (NFC) or the like to communicate with the mobile terminal. In Japanese Unexamined Patent Application Publication No. 2016-76962, the communication unit (antenna unit) is provided in an operation panel together with an operation key (start button) for outputting images, for example.

SUMMARY

In an electronic device such as that described in Japanese Unexamined Patent Application Publication No. 2016-76962, for example, when a user holds the mobile terminal over the communication unit, there is concern that the mobile terminal or the like may touch the operation keys of the operation panel and the operation keys may be erroneously operated.

The present disclosure takes the aforementioned reason into consideration, and aims to provide an electronic device, an image forming device, a control method for the electronic device, and a program with which an erroneous operation of an operation key is less likely to occur.

An electronic device according to an aspect of the present disclosure is provided with an operation panel, a communication unit, and a processing unit. The operation panel has a first operation key and a second operation key within a specific region. The communication unit is arranged within the specific region of the operation panel, and is a location for communicating wirelessly with a mobile terminal that is in a state opposing the specific region. The processing unit determines whether an operation result of the second operation key is valid or invalid on the basis of operations of the first operation key and the second operation key in such a way that the operation result of the second operation key is invalidated in a case where the first operation key has been operated.

An image forming device according to an aspect of the present disclosure is provided with the aforementioned electronic device, and the electronic device has an image forming function.

A control method for an electronic device according to an aspect of the present disclosure is a control method for an electronic device provided with an operation panel, which has a first operation key and a second operation key within a specific region, and a communication unit. The communication unit is arranged within the specific region of the operation panel, and is a location for communicating wirelessly with a mobile terminal that is in a state opposing the specific region. In the control method for the electronic device, it is determined whether an operation result of the second operation key is valid or invalid on the basis of operations of the first operation key and the second operation key in such a way that the operation result of the second operation key is invalidated in a case where the first operation key has been operated.

A program according to an aspect of the present disclosure is a program for causing a computer system to execute the aforementioned control method for the electronic device.

DESCRIPTION OF THE EMBODIMENTS

Embodiment 1

(1) Overview

Figure 2:
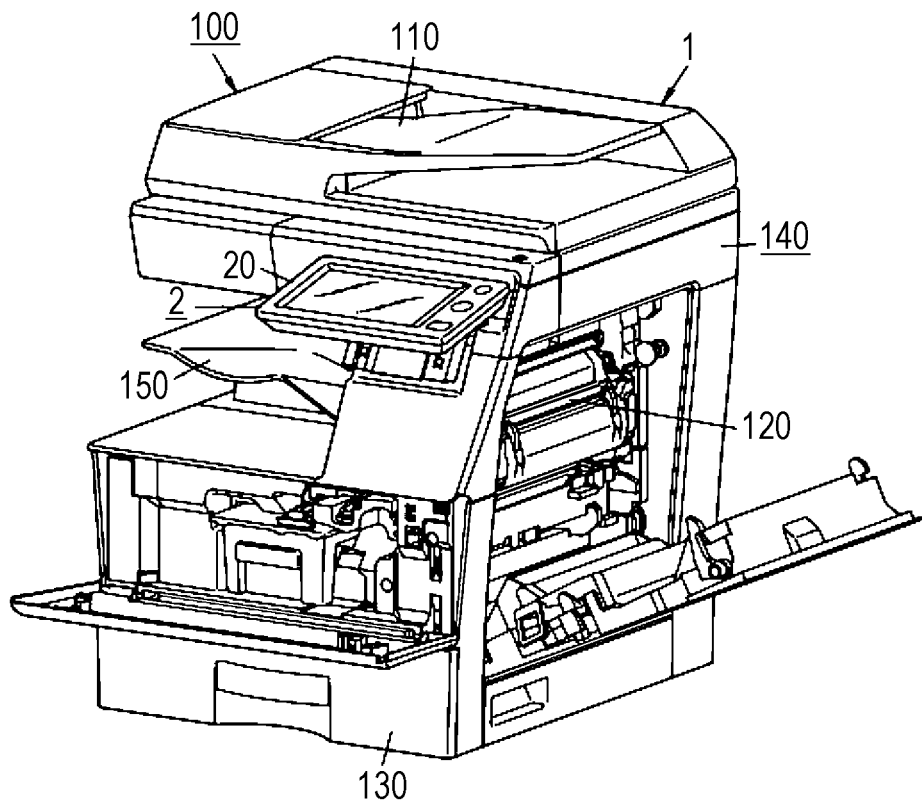
FIG. 2 is a schematic perspective view depicting the external appearance of the image forming device.

An electronic device 1 according to the present embodiment makes up the main body of an image forming device 100 as depicted in FIG. 2. In other words, the image forming device 100 is provided with the electronic device 1, and the electronic device 1 has an image forming function. The image forming device 100 is a device that forms an image on recording paper or the like by means of an electrophotographic method, for example. As an example in the present embodiment, the image forming device 100 is a multifunction peripheral (MFP) in which functions such as those of a copy machine, a printer, an image scanner, and a facsimile are aggregated into one device. The image forming device 100 is installed in an office, an educational institution, a store such as a convenience store, or the like.

Figure 1A:
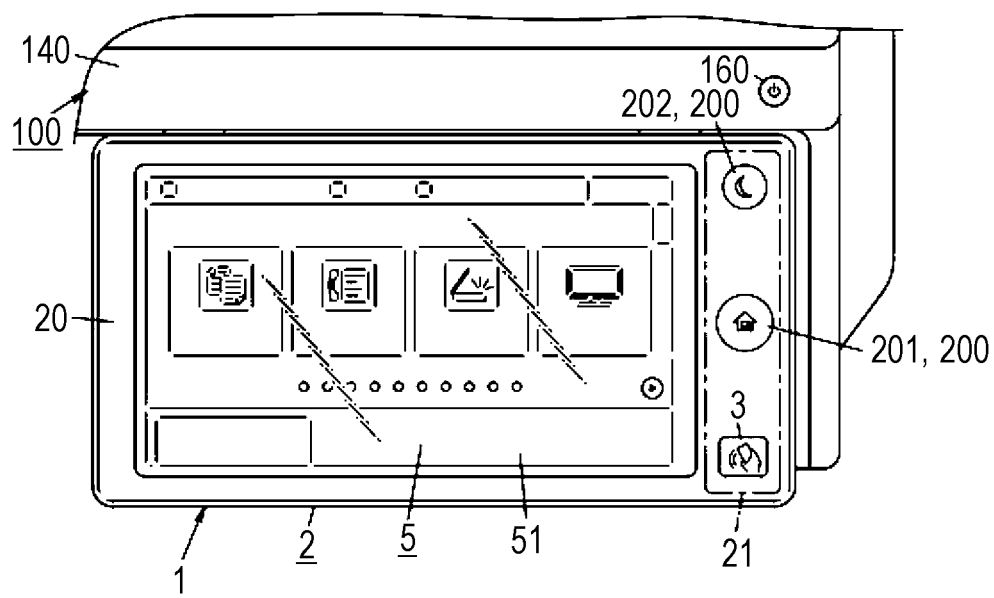
FIG. 1A is a plan view depicting an operation panel and the periphery thereof of an image forming device provided with an electronic device according to embodiment 1.

This type of electronic device 1 is provided with an operation panel 2 for receiving user operations, as depicted in FIG. 1A. The operation panel 2 has a plurality of operation keys including a first operation key 201 and a second operation key 202, within a specific region 21. Hereinafter, the plurality of operation keys are sometimes also referred to as "operation keys 200" when the plurality of operation keys are not particularly differentiated. In other words, the electronic device 1 is configured to execute a variety of processing in accordance with user operations received by the operation panel 2.

Figure 1B:
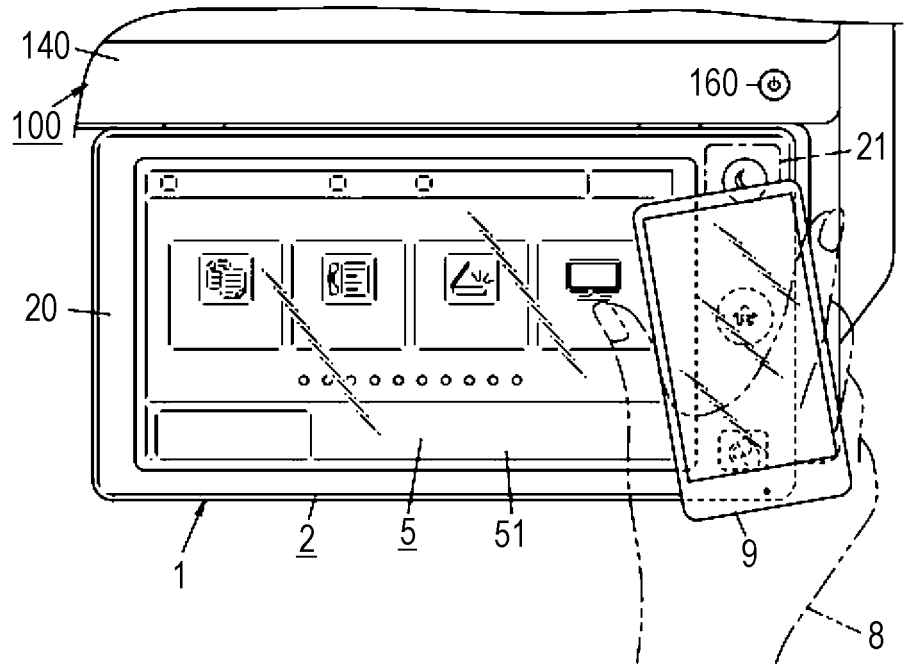
FIG. 1B is a plan view depicting the operation panel and the periphery thereof of the image forming device, in a state in which a mobile terminal is held over the operation panel.

Incidentally, the electronic device 1 according to the present embodiment is provided with a communication unit 3 for communicating wirelessly with a mobile terminal 9. The communication unit 3 is arranged within the specific region 21 of the operation panel 2. The communication unit 3 is configured to communicate wirelessly with the mobile terminal 9, which is in a state opposing the specific region 21 of the operation panel 2, as depicted in FIG. 1B. As an example, the communication unit 3 communicates with the mobile terminal 9 by means of near field communication (NFC) or the like.

In other words, a user 8 holds the mobile terminal 9 over the communication unit 3 provided in the operation panel 2, and a state is thereby entered in which wireless communication is possible between the communication unit 3 and the mobile terminal 9. The expression "hold over" used in the present disclosure refers to the user 8 covering a subject (here, the communication unit 3) with an object held in his or her hand or attached to his or her body (here, the mobile terminal 9).

In this way, due to the communication unit 3 being arranged within the specific region 21 of the operation panel 2, compared to a case where the communication unit 3 is arranged in location other than the operation panel 2 in the electronic device 1, it is easy for the user 8 to hold the mobile terminal 9 over the communication unit 3, and an improvement in convenience can be expected. However, when the user 8 holds the mobile terminal 9 over the communication unit 3, it is feasible for the mobile terminal 9 or the like (the mobile terminal 9, the hand of the user 8, a case or strap attached to the mobile terminal 9, or the like) to touch the operation keys 200 of the operation panel 2.

Thus, the electronic device 1 according to the present embodiment is further provided with a processing unit 4 (see FIG. 4) that determines whether an operation result of the second operation key 202 is valid or invalid, in order to make it less likely that an erroneous operation of the operation keys 200 will occur in a case where the mobile terminal 9 or the like has touched the operation keys 200. The processing unit 4 determines whether an operation result of the second operation key 202 is valid or invalid on the basis of operations of the first operation key 201 and the second operation key 202 in such a way that the operation result of the second operation key 202 is invalidated in a case where the first operation key 201 has been operated.

For example, in a state in which the specific region 21 of the operation panel 2 is covered by the mobile terminal 9, even if the mobile terminal 9 or the like touches the second operation key 202 within the specific region 21, an operation result of the second operation key 202 is invalidated if the first operation key 201 within the specific region 21 is being similarly operated. In other words, in a state in which the user 8 holds the mobile terminal 9 over the communication unit 3, there are cases where the mobile terminal 9 or the like touches not only the second operation key 202 within the specific region 21 but also the first operation key 201 within the specific region 21 in a similar manner. Then, in a case where the first operation key 201 has been operated by means of the mobile terminal 9 or the like, the operation result of the second operation key 202 is invalidated by the processing unit 4, and it consequently becomes less likely that an erroneous operation caused by touching of the mobile terminal 9 or the like will occur with regard to at least the second operation key 202.

(2) Configuration (2.1) Overall Configuration

Hereinafter, first, a description will be given regarding the overall configuration of the image forming device 100 provided with the electronic device 1 according to the present embodiment.

In the present embodiment, the image forming device 100 is a device that forms an image on recording paper or the like by means of an electrophotographic method, and is a multifunction peripheral in which a plurality of functions including that of a copy machine are aggregated into one device as mentioned above.

Figure 3:
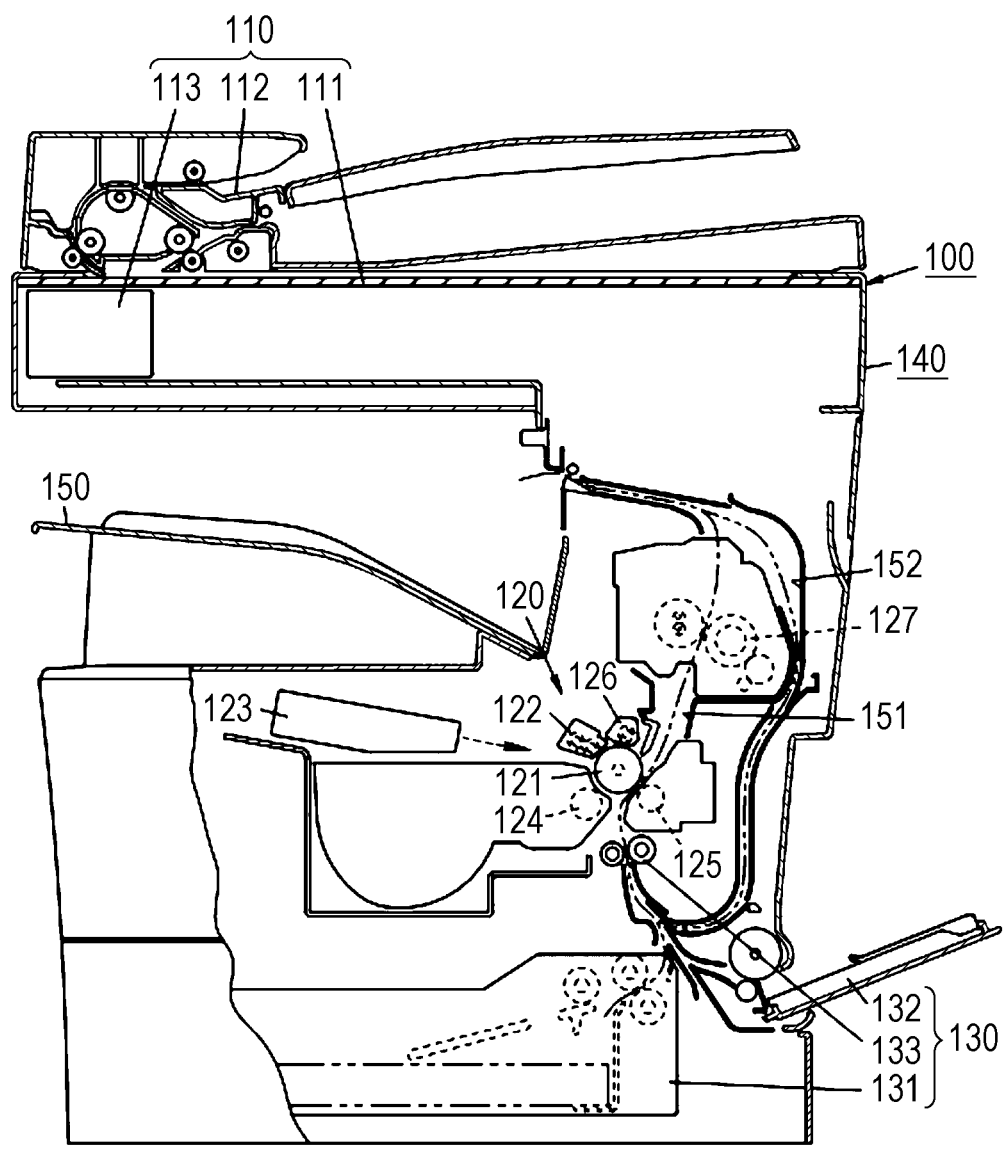
FIG. 3 is a schematic perspective view depicting the internal configuration of the image forming device.

The image forming device 100 is provided with an image reading unit 110, an image forming unit 120, a paper feeding unit 130, and the operation panel 2 as depicted in FIGS. 2 and 3. Furthermore, the image forming device 100 is further provided with one casing 140 that houses part of the image reading unit 110, the image forming unit 120, and the paper feeding unit 130. In the present embodiment, the image reading unit 110, the image forming unit 120, the paper feeding unit 130, the casing 140, and the operation panel 2 are all included in the constituent elements of the electronic device 1.

The image reading unit 110 has a document holder 111, an automatic document feeder (ADF) 112, and a document image reading unit 113. The document holder 111 is composed of transparent glass constituting a top plate of the casing 140. The automatic document feeder 112 automatically feeds documents to the document holder 111. The document image reading unit 113 scans and reads an image of a document placed on the document holder 111 or a document fed to the document holder 111 by the automatic document feeder 112.

The image forming unit 120 is arranged below the image reading unit 110 and has a plurality of units that carry out an electrophotographic process. Here, the image forming unit 120 has a photoreceptor drum 121, a charging unit 122, an optical scanning unit 123, a developing unit 124, a transfer unit 125, a cleaning unit 126, and a fixing unit 127, as depicted in FIG. 3. The charging unit 122, the optical scanning unit 123, the developing unit 124, the transfer unit 125, and the cleaning unit 126 are arranged so as to be side-by-side in this order in the counterclockwise direction in FIG. 3 in the periphery of the photoreceptor drum 121. Furthermore, the image forming unit 120 also has a destaticizing unit (not depicted) for destaticizing the photoreceptor drum 121, arranged between the cleaning unit 126 and the charging unit 122 in the periphery of the photoreceptor drum 121.

The charging unit 122 charges the photoreceptor drum 121 in such a way that the surface of the photoreceptor drum 121 has a uniform prescribed potential. The optical scanning unit 123 radiates light (laser light) onto the charged surface of the photoreceptor drum 121 and scans the surface of the photoreceptor drum 121 to form an electrostatic latent image of the surface of the photoreceptor drum 121. The developing unit 124 adheres charged toner to the electrostatic latent image formed on the surface of the photoreceptor drum 121, and the electrostatic latent image is developed to form a toner image. The transfer unit 125 transfers the developed toner image onto recording paper. The cleaning unit 126 removes the developer and toner remaining on the photoreceptor drum 121 for it to be possible for a new image (toner image) to be formed on the photoreceptor drum 121. The destaticizing unit destaticizes the surface of the photoreceptor drum 121 after cleaning, and makes the charge properties of the photoreceptor drum 121 uniform. The fixing unit 127 fixes (sticks) the toner image transferred onto the recording paper by the transfer unit 125, to the recording paper by means of heat and/or pressure or the like.

The paper feeding unit 130 is arranged below the image forming unit 120 and feeds recording paper to the image forming unit 120. The paper feeding unit 130 has at least one paper cassette 131, a manual paper feed tray 132, and resist rollers 133. The image forming device 100 extracts one sheet of recording paper from either of the at least one paper cassette 131 and the manual paper feed tray 132, and conveys the recording paper to a position where the tip end of the recording paper is sandwiched in a nip section of the resist rollers 133. The resist rollers 133 convey the recording paper in such a way that the recording paper reaches the transfer unit 125 at a timing when a writing start position for the electrostatic latent image onto the photoreceptor drum 121 and a transfer start position for the toner image onto the recording paper coincide.

The aforementioned image forming device 100 feeds the recording paper from the paper feeding unit 130 to the image forming unit 120, and outputs the recording paper to which the toner image has been fixed, to a paper output tray 150 via a first conveyance path 151 within the casing 140. Furthermore, the image forming device 100 has, within the casing 140, a second conveyance path 152 for switchback-conveying the recording paper when the rear surface of the recording paper is to be printed upon.

The operation panel 2 is a unit for receiving user operations as mentioned above. The operation panel 2 protrudes to the front from the front surface of an upper end section of the casing 140 as depicted in FIG. 2. In the present embodiment, the operation panel 2 has a tilt function with which the orientation of an operation surface 20 of the operation panel 2 can be changed in the vertical direction. That is, the operation panel 2 is held by the casing 140 in a state in which the operation panel 2 is able to swing relative to the casing 140.

(2.2) Operation Panel

Next, a more detailed description will be given regarding the configuration relating to the operation panel 2 of the image forming device 100 provided with the electronic device 1 according to the present embodiment. In the present embodiment, as depicted in FIG. 2, a description will be given assuming a state in which the operation surface 20 of the operation panel 2 is facing upward, that is, a state in which the operation surface 20 of the operation panel 2 constitutes the upper surface of the operation panel 2. Therefore, hereinafter, a description will be given using directions seen from the user 8 stood in front of the image forming device 100 (depth direction and horizontal direction); however, these directions are not intended to restrict the installation state or the like of the image forming device 100.

The operation panel 2 has the plurality of operation keys 200 (first operation key 201 and second operation key 202) and a display unit 5 having a rectangular screen 51, as depicted in FIG. 1A. The first operation key 201 and the second operation key 202 are arranged on the operation surface 20 of the operation panel 2 together with the screen 51 of the display unit 5. Furthermore, the communication unit 3 for communicating wirelessly with the mobile terminal 9 is also provided on the operation surface 20 of the operation panel 2. Furthermore, a power button 160 for switching the electrification state of the electronic device 1 is arranged to the rear (above in FIG. 1A) of the second operation key 202 in the casing 140.

The first operation key 201 and the second operation key 202 make up the operation keys 200 that receive operations of the user 8. The output of the operation keys 200 changes according to the operation of the operation keys 200. In the present embodiment, the output of the operation keys 200 is "on" when the operation keys 200 are being operated and "off" when the operation keys 200 are not being operated. The word "operate" used in the present disclosure refers to the user 8 pressing the operation keys 200 in a case where the operation keys 200 are push button mechanical switches, and refers to the user 8 touching the operation keys 200 in a case where the operation keys 200 are touch switches (touch sensors). As an example in the present embodiment, the first operation key 201 and the second operation key 202 are both electrostatic capacitive switches, that is, electrostatic capacitive touch switches.

In the present embodiment, the first operation key 201 is a home key and the second operation key 202 is a power saving key. The home key is an operation key (button) for displaying a home screen on the screen 51 of the display unit 5. The power saving key is an operation key (button) for transitioning the operation mode of the electronic device 1 to a sleep mode. In a case where the operation mode of the electronic device 1 is in the sleep mode, the supply of power to a specific location (device) of the electronic device 1 including at least the communication unit 3 stops, and the power consumed by the electronic device 1 due to standby power or the like is suppressed. In other words, the power saving key (second operation key 202) is an operation key 200 for an operation relating to the electrification state of at least the communication unit 3. In contrast, the home key (first operation key 201) is an operation key 200 for an operation other than the operation relating to the electrification state of the communication unit 3.

The communication unit 3 communicates with the mobile terminal 9, which is a comparatively short distance from the communication unit 3 (approximately 10 cm as an example), by means of wireless communication such as near field communication in which radio waves are the transmission medium, or optical communication in which light such as infrared rays are the transmission medium, for example. Here, the communication unit 3 is a location where the transmission medium (radio waves, light, or the like) is actually exchanged with the mobile terminal 9. For example, an antenna that transmits and receives radio waves corresponds to the communication unit 3 in a case where the communication scheme is near field communication, and a light emitting unit and/or a light receiving unit corresponds to the communication unit 3 in a case where the communication scheme is optical communication.

The mobile terminal 9, which is a communication partner for the communication unit 3, is a terminal being carried by (or attached to) the user 8, and is a smartphone, a tablet terminal, a wearable terminal such as a smartwatch, an IC (integrated circuit) card, or the like. As an example in the present embodiment, it is assumed that the communication scheme of the communication unit 3 is near field communication and the mobile terminal 9 is a smartphone owned by the user 8. In addition, the communication unit 3 is configured using an antenna-integrated module IC for near field communication, and is capable of bidirectional communication with the mobile terminal 9.

In other words, the user 8 holds the mobile terminal 9 constituted by a smartphone over the communication unit 3 provided in the operation panel 2 as depicted in FIG. 1B, and a state is thereby entered in which bidirectional communication is possible between the communication unit 3 and the mobile terminal 9. A control unit 6 (see FIG. 4) that is described hereinafter controls the starting, stopping, and the like of the communication with the mobile terminal 9 performed by the communication unit 3. In FIG. 1B, the hand of the user 8 is depicted using imaginary lines (two-dot chain lines).

The electronic device 1 is able to exchange various information with the mobile terminal 9 by communicating wirelessly with the mobile terminal 9 using the communication unit 3. An example of the information transmitted from the communication unit 3 to the mobile terminal 9 is communication setting information desired for pairing the electronic device 1 and the mobile terminal 9 pertaining to a communication function other than that of the communication unit 3. In summary, in a case where the electronic device 1 is configured to be able to link with the mobile terminal 9 by means of a communication function based on Wi-Fi (registered trademark) or the like other than that of the communication unit 3, it is possible for communication setting information desired for setting this communication function to be transmitted from the communication unit 3 to the mobile terminal 9.

Furthermore, information that is transmitted from the communication unit 3 to the mobile terminal 9 is not restricted to communication setting information, and may be image information or the like of a document read by the image reading unit 110 by means of an image scanner function of the image forming device 100, for example. Image information or the like of a photograph and/or a document or the like stored in the mobile terminal 9 is an example of information that is transmitted from the mobile terminal 9 to the communication unit 3. In summary, due to image information being transmitted from the mobile terminal 9 to the communication unit 3, in the image forming device 100, it is possible for an image of a photograph and/or a document or the like stored in the mobile terminal 9 to be formed on recording paper by means of a printer function.

The display unit 5 is composed of a full-color liquid crystal display (LCD) module, for example. In the present embodiment, the display unit 5 is a touch panel display integrated with a sensor for detecting touch operations. Consequently, the operation panel 2 has a function of displaying arbitrary images on the screen 51 of the display unit 5, and a function of detecting touch operations (a tap, swipe, drag, or the like) for objects such as icons displayed on the screen 51 of the display unit 5. That is, objects displayed on the screen 51 of the display unit 5 also constitute the operation keys 200 that receive operations of the user 8, similar to the first operation key 201 and the second operation key 202. The operation keys 200 made up of objects displayed on the screen 51 of the display unit 5 receive operations of the user 8 for instructing starting, stopping, paper size, density, magnification, color mode, and the like for copying processing when carrying out copying, for example.

In the present embodiment, the home screen is displayed on the screen 51 of the display unit 5 due to the first operation key 201 (home key) being operated. The home screen includes a plurality of objects (icons) for selecting functions such as those of a copy machine, a facsimile, or an image scanner.

The first operation key 201, the second operation key 202, and the communication unit 3 described heretofore are arranged within the specific region 21 of the operation surface 20 of the operation panel 2. In other words, the specific region 21 is constituted by region having the first operation key 201, the second operation key 202, and the communication unit 3 arranged therein, which is at least a partial region of the operation surface 20 of the operation panel 2. In the present embodiment, the specific region 21 is constituted by a region at the right side of the screen 51 of the display unit 5, from within the operation surface 20 of the operation panel 2, as depicted in FIG. 1A. Here, the specific region 21 is a region having a rectangular shape that is long in the depth direction (vertical direction in FIG. 1A).

Therefore, in a state in which the user 8 holds the mobile terminal 9 over the communication unit 3 provided in the operation panel 2, at least part of the mobile terminal 9 opposes the specific region 21 in the operation panel 2. Thus, the communication unit 3 communicates wirelessly with the mobile terminal 9, which is in a state opposing the specific region 21.

Here, the specific region 21 is set within the operation surface 20 of the operation panel 2, and therefore the first operation key 201, the second operation key 202, and the communication unit 3 are arranged on one surface side of the operation panel 2. In the present embodiment, a state is assumed in which the operation surface 20 constitutes the upper surface of the operation panel 2, and therefore the first operation key 201, the second operation key 202, and the communication unit 3 are arranged on the upper surface side (upper side) of the operation panel 2. In other words, the first operation key 201, the second operation key 202, and the communication unit 3 are all provided on a surface (operation surface 20) facing the same direction (upward) seen from the operation panel 2. It is sufficient for the surface facing the same direction seen from the operation panel 2 to be a surface that opposes the mobile terminal 9 when the mobile terminal 9 is held over the communication unit 3 at least, and the surface includes a plurality of contiguous surfaces that are not only on the same plane but also have angles formed by the respective normal lines thereof that are acute angles (90 degrees or less).

Figure 4:
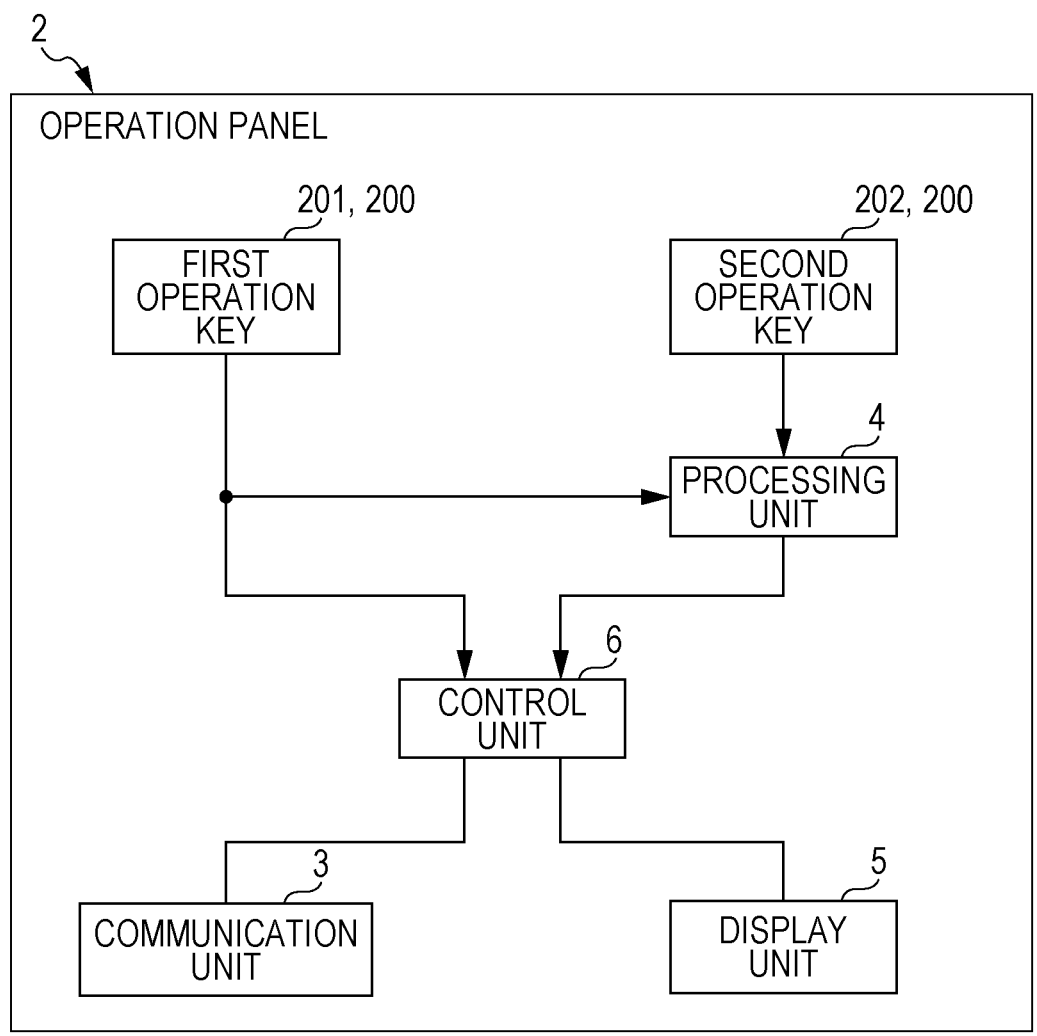
FIG. 4 is a block diagram depicting the configuration of the main parts of the electronic device.

Incidentally, the operation panel 2 is provided with the processing unit 4 and the control unit 6 in addition to the first operation key 201, the second operation key 202, the communication unit 3, and the display unit 5, as depicted in FIG. 4. That is, the electronic device 1 according to the present embodiment is further provided with the processing unit 4 and the control unit 6.

The control unit 6 is mainly configured of a computer system having a processor such as a CPU (central processing unit) and a memory. The communication unit 3 and the display unit 5 are electrically connected to the control unit 6. The control unit 6 executes various forms of control with regard to the communication unit 3 and the display unit 5. Furthermore, the first operation key 201 and the second operation key 202 are electrically connected to the control unit 6. However, the second operation key 202 is indirectly connected to the control unit 6 via the processing unit 4. The control unit 6 executes control for each unit of the electronic device 1 including the communication unit 3 and the display unit 5 on the basis of operation results of the first operation key 201 and the second operation key 202. The control unit 6 executes control associated with the first operation key 201 (or the second operation key 202) when the operation result of the first operation key 201 (or the second operation key 202) is "on state".

The processing unit 4 is mainly configured of a computer system having a processor such as a CPU and a memory. The processing unit 4 is electrically connected between the second operation key 202 and the control unit 6, and determines whether an operation result of the second operation key 202 is valid or invalid. In other words, the operation result of the second operation key 202 that is input to the control unit 6 is determined not only according to the output of the second operation key 202, and the operation result of the second operation key 202 that is input to the control unit 6 is sometimes "off state" even if the output of the second operation key 202 is "on". In other words, there are cases where the processing unit 4 invalidates (sets to an off state) the operation result of the second operation key 202 within software even when the second operation key 202, which is implemented as hardware, has been operated. The operation result of the second operation key 202 that is input to the control unit 6 is "on state" only in a case where the output of the second operation key 202 is "on" and the operation result of the second operation key 202 is determined as valid by the processing unit 4.

The first operation key 201 is electrically connected to the processing unit 4. The processing unit 4 determines whether an operation result of the second operation key 202 is valid or invalid on the basis of operations of the first operation key 201 and the second operation key 202 in such a way that the operation result of the second operation key 202 is invalidated in a case where the first operation key 201 has been operated. In other words, the processing unit 4 determines whether an operation result of the second operation key 202 is valid or invalid with not only the operation of the second operation key 202 but also the operation of the first operation key 201 being included. Therefore, the processing unit 4 determines the operation result of the second operation key 202 that is output to the control unit 6, in accordance with a determination algorithm pertaining to operations of both the first operation key 201 and the second operation key 202. The determination algorithm is realized by a (computer) program recorded in a non-transitory recording medium such as the memory of the processing unit 4. The program may be recorded in advance in the memory or the like of the processing unit 4, or may be provided via an electrical communication line or by way of an external recording device such as a memory card. A specific determination algorithm is described in the "(3) Operation of Processing Unit" section.

Hereinafter, the arrangement and shapes of the first operation key 201, the second operation key 202, and the communication unit 3 will be described in greater detail with reference to FIGS. 5A and 5B. FIG. 5B is a right side view broken at the position of line VB-VB in FIG. 5A.

Figure 5A:
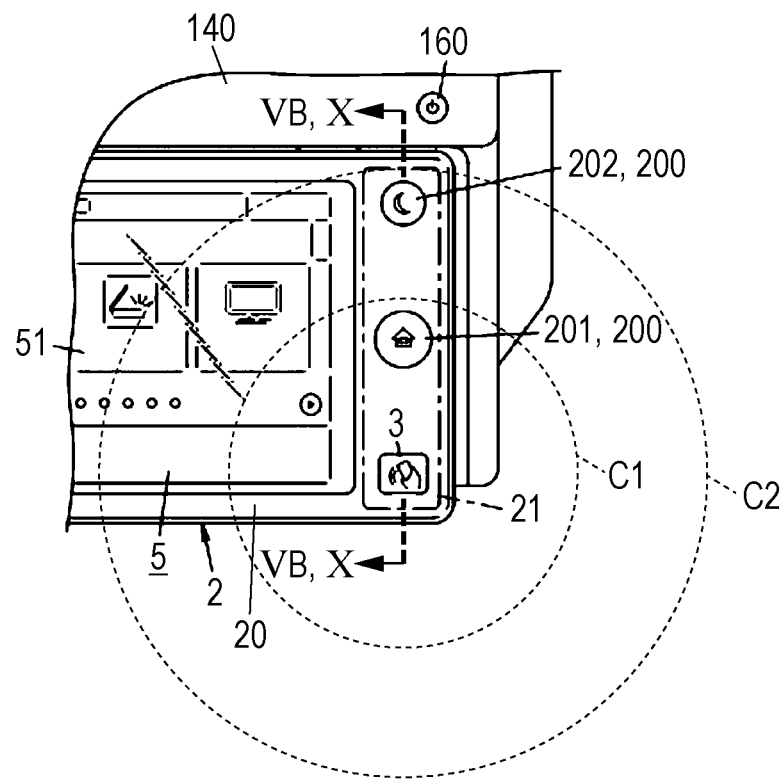
FIG. 5A is a plan view depicting the operation panel and the periphery thereof.
Figure 5B:
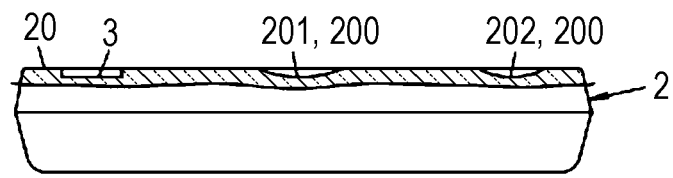
FIG. 5B is a partially broken side view depicting the operation panel.

The first operation key 201, the second operation key 202, and the communication unit 3 are arranged along one side (the right side) of the screen 51 of the display unit 5 as depicted in FIG. 5A. Here, the first operation key 201, the second operation key 202, and the communication unit 3 are arranged spaced apart to a certain extent. In the present embodiment in particular, the first operation key 201, the second operation key 202, and the communication unit 3 are arranged on one straight line that extends in the depth direction, within the specific region 21.

In addition, the first operation key 201, the second operation key 202, and the communication unit 3 are arranged side-by-side in the order of the communication unit 3, the first operation key 201, and the second operation key 202 from the front (downward in FIG. 5A) to the rear (upward in FIG. 5A). In other words, the first operation key 201 is positioned to the rear of the communication unit 3, and the second operation key 202 is positioned further to the rear of the first operation key 201. Therefore, the distance from the communication unit 3 to the first operation key 201 is shorter than the distance from the communication unit 3 to the second operation key 202. Thus, as depicted in FIG. 5A, the diameter of an imaginary circle C1 that is centered on the communication unit 3 and passes near the first operation key 201 is smaller than the diameter of an imaginary circle C2 that is centered on the communication unit 3 and passes near the second operation key 202. The first operation key 201 is positioned inside the imaginary circle C1, and the second operation key 202 is positioned between the imaginary circle C2 and the imaginary circle C1.

The first operation key 201 is formed in a circular shape in plan view. The second operation key 202 is formed in a circular shape having a smaller diameter than the first operation key 201 in plan view. The communication unit 3 is formed in a rectangular shape in plan view. Furthermore, as depicted in FIG. 5B, the surfaces of each of the first operation key 201, the second operation key 202, and the communication unit 3 are slightly recessed from the operation surface 20 of the operation panel 2. Consequently, it becomes less likely that the mobile terminal 9 or the like will touch the first operation key 201 and the second operation key 202 when the user 8 holds the mobile terminal 9 over the communication unit 3 provided in the operation panel 2.

(3) Operation of Processing Unit

Next, an operation of the processing unit 4 in the aforementioned electronic device 1 will be described with reference to FIGS. 6 to 7C.

In the present embodiment, the processing unit 4 invalidates the operation result of the second operation key 202 in a case where the second operation key 202 has been operated in an invalid period T1 (see FIG. 7A) that is composed of a period from the starting time point of an operation of the first operation key 201 to the ending time point of the operation of the first operation key 201. That is, the period from the start to the end of an operation of the first operation key 201 is an invalid period T1 for invalidating an operation result of the second operation key 202.

Figure 6:
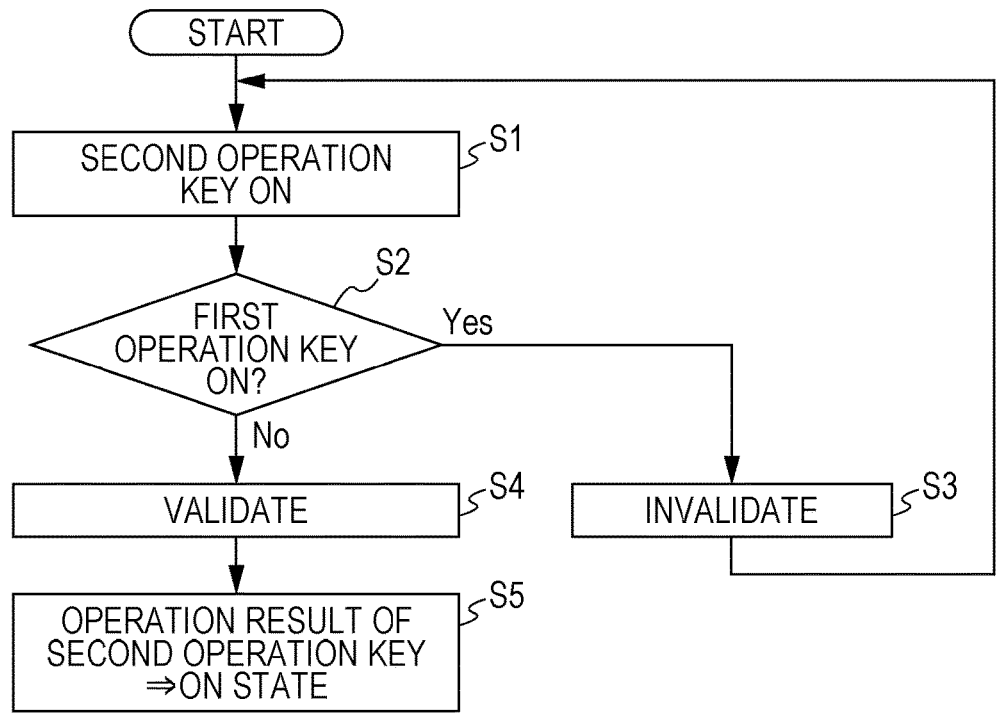
FIG. 6 is a flowchart depicting an operation of the electronic device.

Specifically, the processing unit 4 determines an operation result of the second operation key 202 that is output to the control unit 6, in accordance with the flowchart in FIG. 6. In other words, when the second operation key 202 is operated and the output of the second operation key 202 is on (S1), the processing unit 4 determines whether or not the output of the first operation key 201 is on (S2). At such time, if the first operation key 201 has been operated and the output of the first operation key 201 is on (step S2: yes), the processing unit 4 invalidates the operation result of the second operation key 202 (S3), and the processing of the processing unit 4 returns to step S1. In this case, the operation result of the second operation key 202 that is input to the control unit 6 is "off state".

However, if the first operation key 201 has not been operated and the output of the first operation key 201 is off (S2: no), the processing unit 4 validates the operation result of the second operation key 202 (S4). Thus, the operation result of the second operation key 202 that is input to the control unit 6 is "on state" (S5).

Figure 7A:
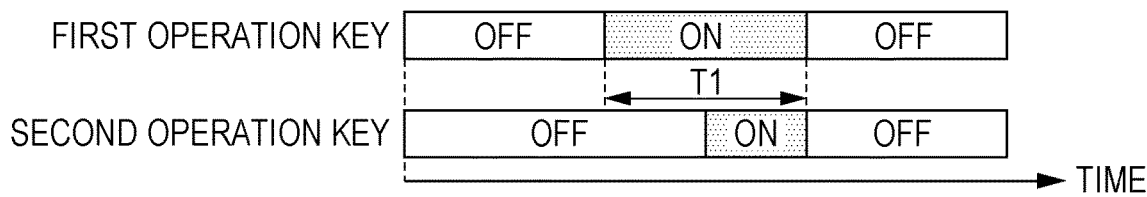
FIGS. 7A to 7C are timing charts depicting an operation of the electronic device.

According to the aforementioned operation of the processing unit 4, for example, as depicted in FIG. 7A, at a time point at which the second operation key 202 has been operated, if the first operation key 201 is being operated (that is, if during the invalid period T1), the processing unit 4 invalidates (sets to an off state) the operation result of the second operation key 202.

Figure 7B:
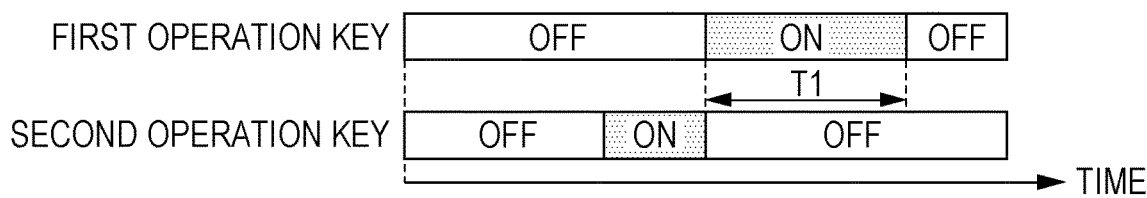
Figure 7C:
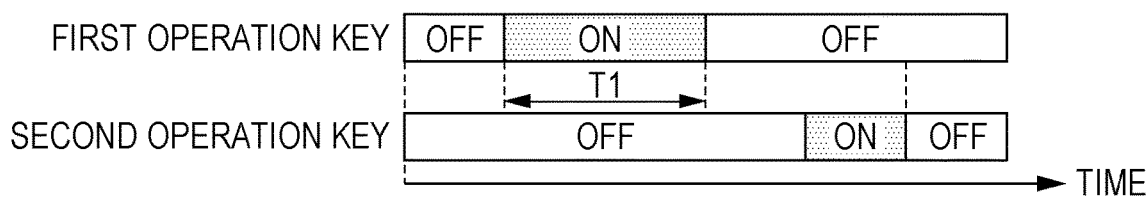

However, for example, as depicted in FIG. 7B, if the second operation key 202 is operated before the start of an operation of the first operation key 201 (that is, before the start of the invalid period T1), the processing unit 4 validates (sets to an on state) the operation result of the second operation key 202. Similarly, for example, as depicted in FIG. 7C, if the second operation key 202 is operated after the end of an operation of the first operation key 201 (that is, after the end of the invalid period T1), the processing unit 4 validates (sets to an on state) the operation result of the second operation key 202.

Here, the processing unit 4 determines in a prescribed sampling cycle whether or not the output of the operation keys 200 is on, and determines that the output of the operation keys 200 is on in a case where the output of the operation keys 200 has been on continuously for a prescribed sampling count. Therefore, a chattering removal time for removing chattering from the output of the operation keys 200 is represented by the product of the sampling cycle and the sampling count. For determining whether or not the output of the first operation key 201 is on, the chattering removal time is preferably shorter than the determination as to whether or not the output of the second operation key 202 is on. Thus, even in a case where the first operation key 201 and the second operation key 202 are operated at exactly the same time, the processing unit 4 can determine that an output is on with regard to the first operation key 201 prior to the second operation key 202, and can invalidate the operation result of the second operation key 202.

According to the electronic device 1 described heretofore, it becomes less likely that an erroneous operation of the operation keys 200 caused by touching of the mobile terminal 9 or the like will occur. For example, as depicted in FIG. 1B, when the user 8 holds the mobile terminal 9 over the communication unit 3, there is a possibility of the operation keys 200 within the specific region 21 being operated by means of the mobile terminal 9 or the like placed on the operation panel 2. At such time, the mobile terminal 9 covers the specific region 21 of the operation panel 2, and therefore, even if the mobile terminal 9 or the like touches the second operation key 202 within the specific region 21, the operation result of the second operation key 202 is invalidated if the first operation key 201 within the specific region 21 is being similarly operated. In other words, in a state in which the user holds the mobile terminal 9 over the communication unit 3, there are cases where the mobile terminal 9 or the like touches not only the second operation key 202 within the specific region 21 but also the first operation key 201 within the specific region 21 in a similar manner. Then, in a case where the first operation key 201 has been operated by means of the mobile terminal 9 or the like, the operation result of the second operation key 202 is invalidated by the processing unit 4, and it consequently becomes less likely that an erroneous operation caused by touching of the mobile terminal 9 or the like will occur with regard to at least the second operation key 202.

Furthermore, in a case such as where the operation keys 200 are electrostatic capacitive switches, for example, even if the mobile terminal 9 or the like does not touch the operation keys 200, there are cases where the operation keys 200 react to electrically conductive metal sections or the like of the mobile terminal 9 and the operation keys 200 are operated. In such a case, in the electronic device 1 according to the present embodiment, it becomes less likely that an erroneous operation caused by the mobile terminal 9 or the like will occur with regard to the second operation key 202 at least.

(4) Modified Examples

The electronic device 1 is merely one of various embodiments of the present disclosure. It is possible for embodiment 1 to be altered in various ways in accordance with the design and so forth provided that the purpose of the present disclosure can be achieved. Furthermore, functions that are the same as those of the processing unit 4 of the electronic device 1 may be realized using a control method for the electronic device 1, a computer program, a non-transitory recording medium having a program recorded thereon, or the like. A control method for the electronic device 1 according to an aspect is a control method for the electronic device 1 provided with the operation panel 2, which has the first operation key 201 and the second operation key 202 within the specific region 21, and the communication unit 3. The communication unit 3 is arranged within the specific region 21 of the operation panel 2, and is a location for communicating wirelessly with the mobile terminal 9, which is in a state opposing the specific region 21. In this control method for the electronic device 1, it is determined whether an operation result of the second operation key 202 is valid or invalid on the basis of operations of the first operation key 201 and the second operation key 202 in such a way that the operation result of the second operation key 202 is invalidated in a case where the first operation key 201 has been operated. A (computer) program according to an aspect is a program for causing a computer system to execute the aforementioned control method for the electronic device 1.

Hereinafter, modified examples of embodiment 1 will be listed. The modified examples described hereinafter can be applied in combination as appropriate.

The operation (determination algorithm) of the processing unit 4 described in embodiment 1 is merely an example, and the determination algorithm can be altered as appropriate. Furthermore, the processing unit 4 is not restricted to a configuration in which an operation result of the second operation key 202 is invalidated (set to an off state) within software. For example, in a case where a switch element is electrically connected between the second operation key 202 and the control unit 6, the processing unit 4 may invalidate an operation result of the second operation key 202 by setting this switch element off. Furthermore, the functions of the processing unit 4 may be incorporated in the control unit 6. In other words, the processing unit 4 may be integrated with the control unit 6. In addition, at least part of the processing unit 4 and the control unit 6 may be provided within the casing 140 rather than the operation panel 2, for example.

Furthermore, the first operation key 201 and the second operation key 202 are not restricted to electrostatic capacitive switches and may be mechanical switches (so-called "hard keys"), resistive film type touch switches, or the like. It goes without saying that different types of switches may be adopted for the first operation key 201 and the second operation key 202. For example, the first operation key 201 may be an electrostatic capacitive switch and the second operation key 202 may be a mechanical switch, or the first operation key 201 may be a mechanical switch and the second operation key 202 may be an electrostatic capacitive switch.

Figure 8A:
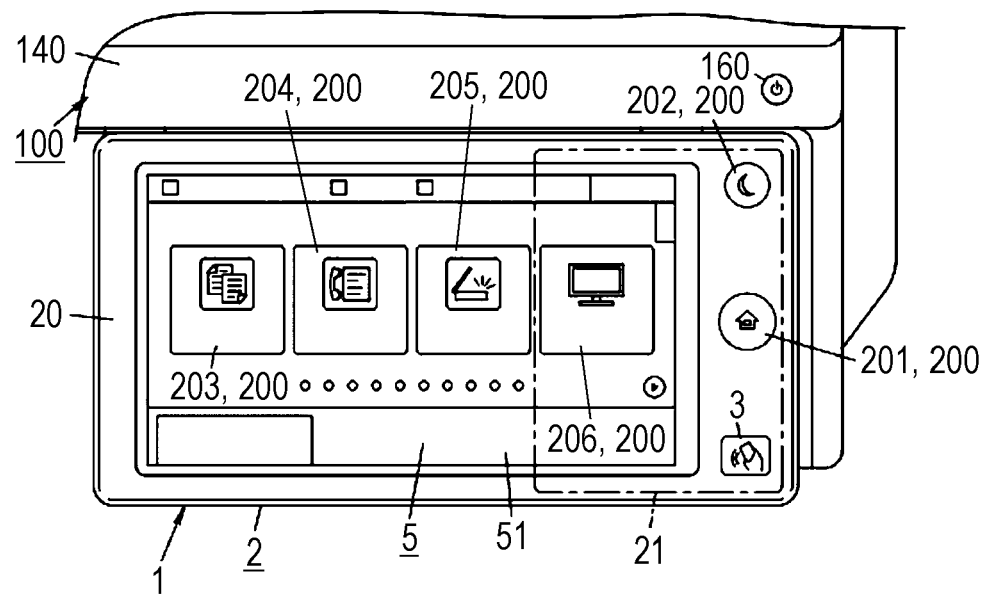
FIG. 8A is a plan view depicting an operation panel and the periphery thereof of an image forming device provided with an electronic device according to a modified example of embodiment 1.
Figure 8B:
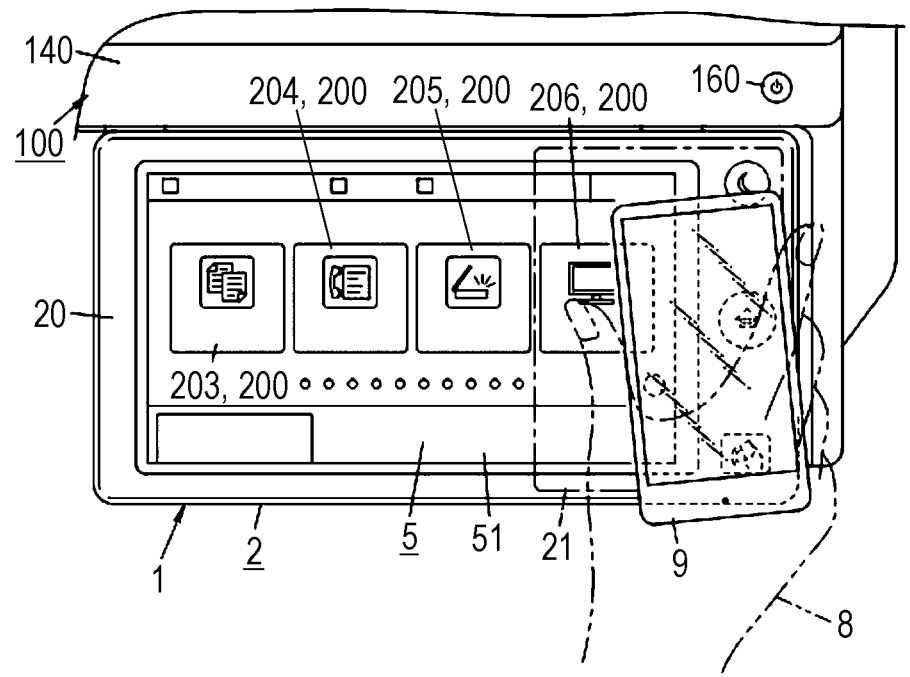
FIG. 8B is a plan view depicting the operation panel and the periphery thereof of the image forming device, in a state in which a mobile terminal is held over the operation panel.

Furthermore, at least one of the first operation key 201 and the second operation key 202 may be provided in plurality. For example, as depicted in FIG. 8A, one object 206 from among a plurality of objects (icons) 203 to 206 displayed on the screen 51 of the display unit 5 may be a first operation key. In other words, as depicted in FIG. 8A, in a case where the specific region 21 is set so as to overlap part of the screen 51 of the display unit 5, the object 206 within this specific region 21 functions as a first operation key. Consequently, as depicted in FIG. 8B, in a state in which at least one of the object 206 serving as a first operation key and the first operation key 201 is operated by means of the mobile terminal 9 or the like, the operation result of the second operation key 202 is invalidated in a manner similar to when the first operation key 201 is operated.

Figure 9A:
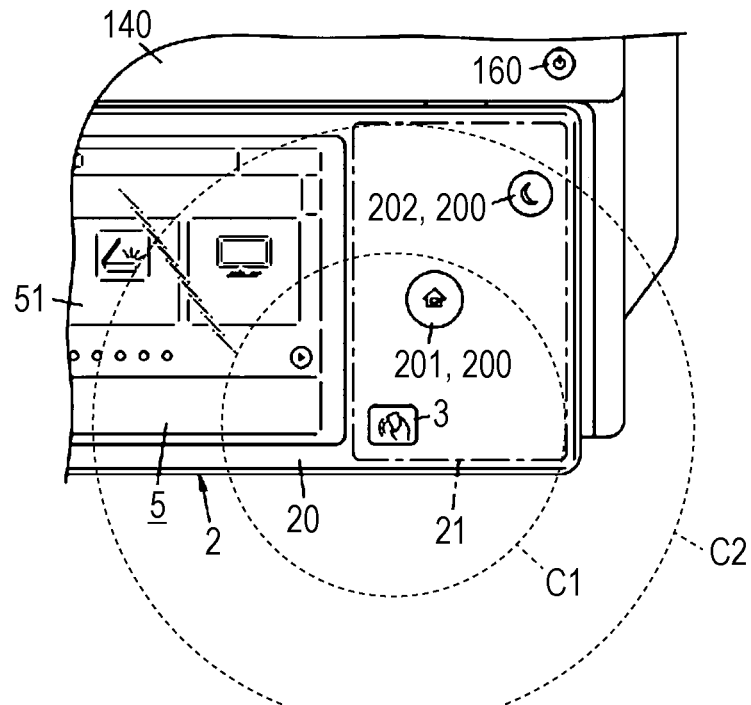
FIGS. 9A and 9B are plan views depicting an operation panel and the periphery thereof of an electronic device according to a modified example of embodiment 1.
Figure 9B:
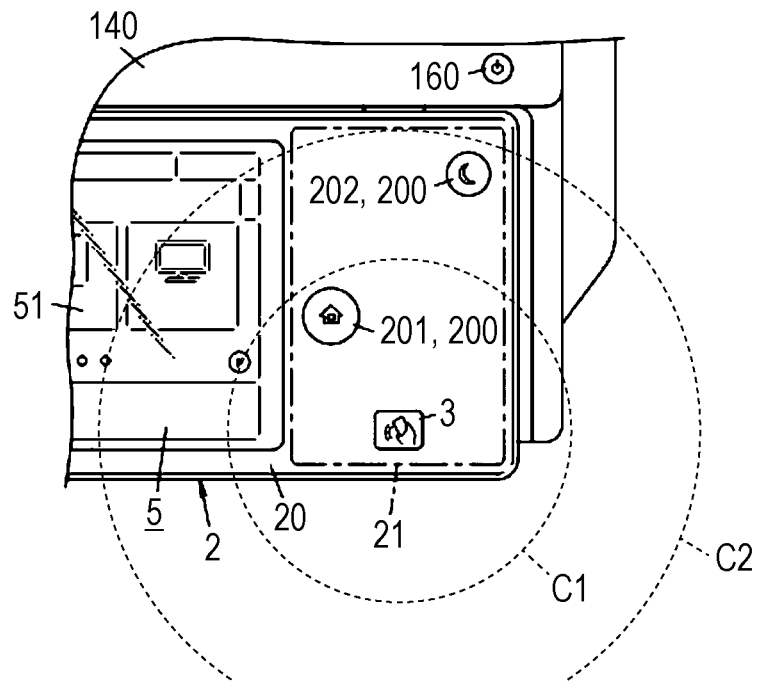

Furthermore, the arrangement of the first operation key 201, the second operation key 202, and the communication unit 3 in the specific region 21 is also not restricted to the arrangement described in embodiment 1, and can be altered as appropriate. For example, the first operation key 201, the second operation key 202, and the communication unit 3 may not be on one straight line, and may be arranged in a scattered manner in the horizontal direction as depicted in FIGS. 9A and 9B. However, compared to the examples in FIGS. 9A and 9B, in embodiment 1 in which the first operation key 201, the second operation key 202, and the communication unit 3 are arranged on one straight line, the specific region 21 can be made smaller and the operation panel 2 can be reduced in size.

Furthermore, the arrangement order of the first operation key 201, the second operation key 202, and the communication unit 3 is also not restricted to the configuration described in embodiment 1. The first operation key 201, the second operation key 202, and the communication unit 3 may be arranged side-by-side in the order of the first operation key 201, the communication unit 3, and the second operation key 202 from the front to the rear, for example. In addition, the surfaces of each of the first operation key 201, the second operation key 202, and the communication unit 3 may not have shapes that are recessed from the operation surface 20 of the operation panel 2.

Figure 10A:
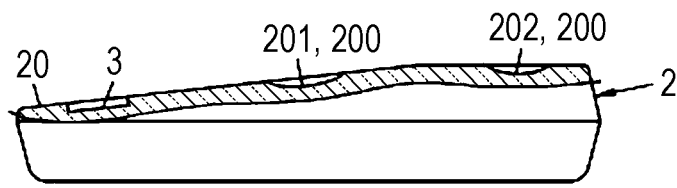
FIGS. 10A and 10B are partially broken side views depicting an operation panel of an electronic device according to a modified example of embodiment 1.
Figure 10B:
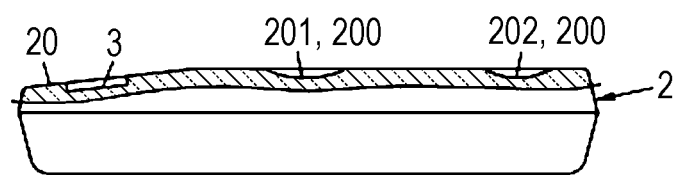

Furthermore, the operation surface 20 on which the specific region 21 is set is not restricted to a planar shape, and may be a surface that is bent or curved, as depicted in FIGS. 10A and 10B, for example. FIGS. 10A and 10B are right side views broken at positions corresponding to line X-X in FIG. 5A. In particular, with an operation surface 20 that has a ridge between the first operation key 201 and the second operation key 202 as depicted in FIG. 10A, it becomes less likely that the mobile terminal 9 or the like will touch the second operation key 202 when the user 8 holds the mobile terminal 9 over the communication unit 3. Furthermore, also with an operation surface 20 that has a ridge between the first operation key 201 and the communication unit 3 as depicted in FIG. 10B, it becomes less likely that the mobile terminal 9 or the like will touch the second operation key 202 when the user 8 holds the mobile terminal 9 over the communication unit 3. Also in the examples in FIGS. 10A and 10B, similar to embodiment 1, the first operation key 201, the second operation key 202, and the communication unit 3 are arranged on one surface (upper surface) side of the operation panel 2, that is, on a surface (operation surface 20) facing the same direction (upward) seen from the operation panel 2. That is, the first operation key 201, the second operation key 202, and the communication unit 3 may not be on the same planar surface as long as they are arranged aggregated on one surface (operation surface 20) side of the operation panel 2.

Figure 11:
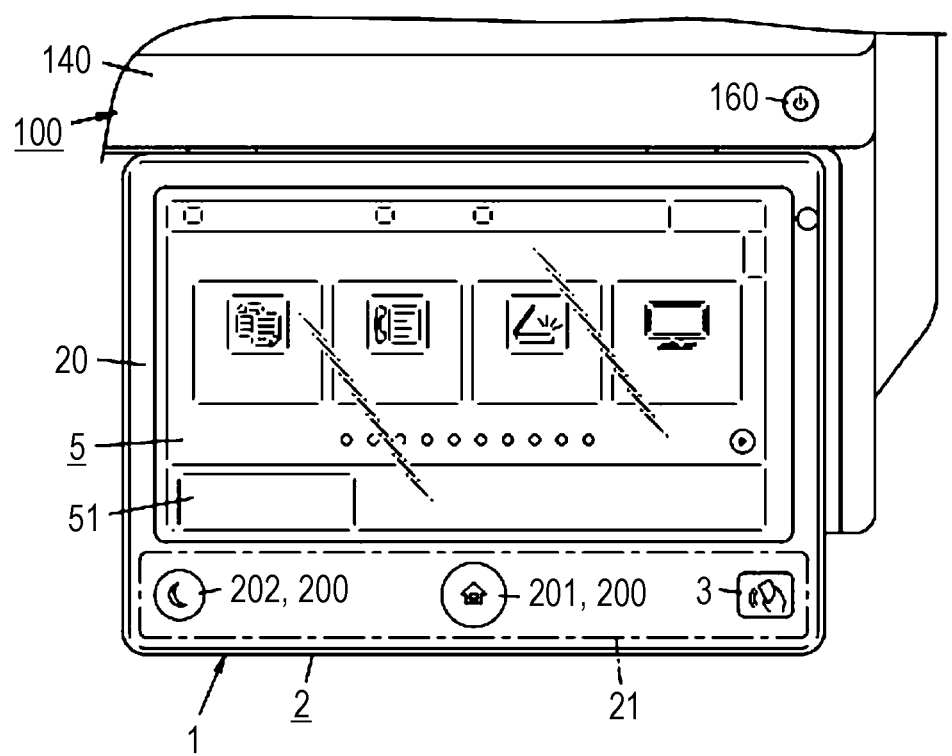
FIG. 11 is a plan view depicting an operation panel and the periphery thereof of an image forming device provided with an electronic device according to a modified example of embodiment 1.

Furthermore, the position of the specific region 21 in the operation panel 2 is also not restricted to the position described in embodiment 1, and can be altered as appropriate. For example, the specific region 21 may be constituted by a region at the front side of the screen 51 of the display unit 5, from within the operation surface 20 of the operation panel 2, as depicted in FIG. 11. In the example in FIG. 11, the first operation key 201, the second operation key 202, and the communication unit 3 are arranged on one straight line along one side (lower side) of the screen 51 of the display unit 5. The first operation key 201, the second operation key 202, and the communication unit 3 are arranged side-by-side in the order of the communication unit 3, first operation key 201, and the second operation key 202 from right to left.

Furthermore, it is sufficient for the electronic device 1 to have a configuration provided with the operation panel 2, and the electronic device 1 is not restricted to the image forming device 100 and may be a television receiver, an audio device, another household electrical device, or the like.

Furthermore, in embodiment 1, the communication between the communication unit 3 and the mobile terminal 9 is bidirectional communication; however, there is no restriction to this configuration, and the communication between the communication unit 3 and the mobile terminal 9 may be unidirectional communication from the communication unit 3 to the mobile terminal 9 or from the mobile terminal 9 to the communication unit 3.

Furthermore, the power button 160 may be provided on the operation panel 2 as an operation key 200. In this case, the power button 160 is an operation key 200 for an operation relating to the electrification state of the communication unit 3, and therefore preferably constitutes a second operation key rather than a first operation key.

Furthermore, the first operation key 201 may include a hidden key. A hidden key is not an operation key 200 that the user 8 deliberately operates with the intention of some kind of operation, and is an operation key that is arranged so as to be undetectable from the external appearance of the operation panel 2, for example. Therefore, it is sufficient for a function serving as a sensor for invalidating an operation result of the second operation key 202 to be assigned to a hidden key, and it is not essential for any kind of function pertaining to an operation of the electronic device 1 to be assigned to a hidden key in a manner similar to the other operation keys 200.

Furthermore, the electronic device 1 may be configured of only the operation panel 2 portion from within the image forming device 100. In this case, the image forming device 100 is provided with the electronic device 1 and each unit having an image forming function within the casing 140.

Furthermore, the operation panel 2 may be incorporated in the casing 140. In other words, the operation panel 2 may be integrated with the casing 140.

Furthermore, in embodiment 1, both an antenna and a module IC for near field communication are arranged within the specific region 21 of the operation panel 2; however, there is no restriction to this configuration, and the module IC may be arranged outside of the specific region 21, for example. In other words, the communication unit 3 is a location where a transmission medium (radio waves, light, or the like) is actually exchanged with the mobile terminal 9, and therefore, in a case where the antenna and the module IC are separate units, it is sufficient for at least the antenna forming part of the communication unit 3 to be arranged within the specific region 21.

Furthermore, in embodiment 1, the second operation key 202 is a power saving key for an operation relating to the electrification state of the communication unit 3 at least; however, the second operation key 202 is not restricted thereto and may be a reset key or the like. With regard to an operation key 200 that, similar to a reset key, cancels a series of operations relating to communication between the communication unit 3 and the mobile terminal 9 regardless of the electrification state of the communication unit 3, for the second operation key 202, an operation result is preferably invalidated as appropriate by the processing unit 4. In summary, an operation result of the operation keys 200 that affects communication between the communication unit 3 and the mobile terminal 9 is invalidated by the processing unit 4, and it thereby becomes possible to avoid erroneous operations of the operation keys 200 that are to be particularly avoided, when the user 8 holds the mobile terminal 9 over the communication unit 3.

Embodiment 2

The electronic device 1 according to the present embodiment is different from the electronic device 1 according to embodiment 1 with regard to the operation of the processing unit 4. Configurations that are similar to those in embodiment 1 are denoted by common reference numbers and descriptions are omitted as appropriate.

The processing unit 4 invalidates an operation result of the second operation key 202 in a case where the second operation key 202 has been operated in an invalid period T2 (see FIG. 13A) that is composed of a period from the starting time point of an operation of the first operation key 201 to a time point that is a fixed time after the ending time point of the operation of the first operation key 201. That is, the invalid period T2 is a period from the starting time point of an operation of the first operation key 201 to the operation of the first operation key 201 ending and a fixed time T0 (see FIG. 13A) additionally elapsing. In a case where the second operation key 202 has been operated within this invalid period T2, the operation result of the second operation key 202 is invalidated. As an example, the fixed time T0 is set in a range from 0.1 seconds or more to 1.0 seconds or less.

Figure 12A:
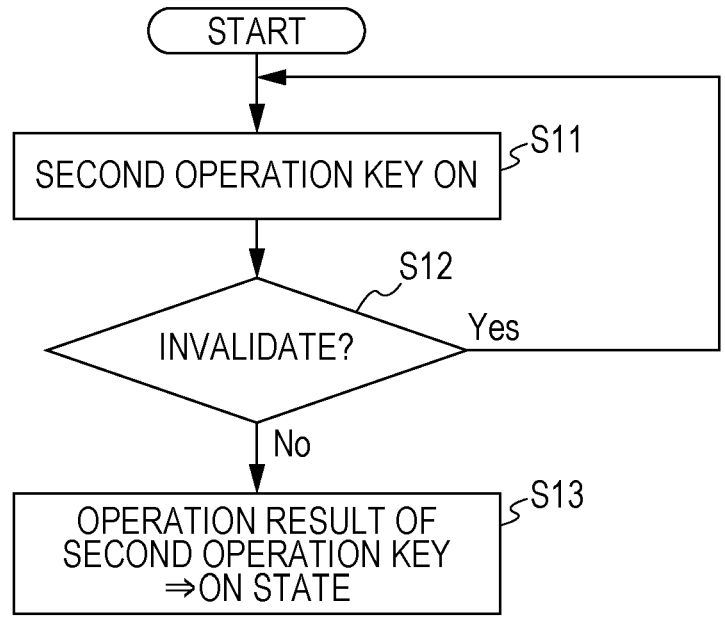
FIGS. 12A and 12B are flowcharts depicting an operation of an electronic device according to embodiment 2.

Specifically, the processing unit 4 determines an operation result of the second operation key 202 that is output to the control unit 6, in accordance with the flowchart in FIG. 12A. In other words, when the second operation key 202 is operated and the output of the second operation key 202 is on (S11), the processing unit 4 determines whether or not the operation result of the second operation key 202 is to be invalidated (S12). At such time, if the operation result of the second operation key 202 is to be invalidated (S12: yes), the processing unit 4 returns to step S11. In this case, the operation result of the second operation key 202 that is input to the control unit 6 is "off state".

However, if the operation result of the second operation key 202 is to be validated (S12: no), the processing unit 4 determines the operation result in accordance with the output (on) of the second operation key 202 at such time. Thus, the operation result of the second operation key 202 that is input to the control unit 6 is "on state" (S13).

Figure 12B:
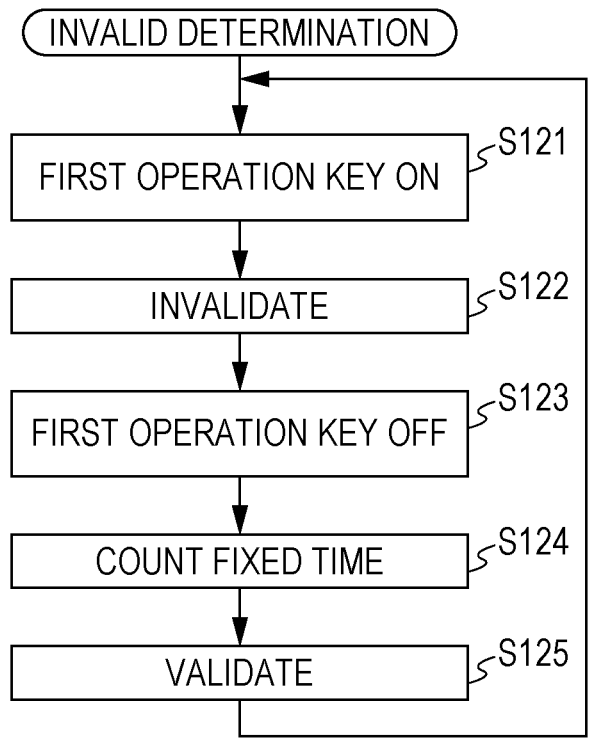

Incidentally, regarding whether the operation result of the second operation key 202 used in the determination in step S12 is valid or invalid, the processing unit 4 carries out the determination by means of invalid determination processing indicated in the flowchart in FIG. 12B. In other words, when the first operation key 201 is operated and the output of the first operation key 201 is on (S121), the processing unit 4 invalidates the operation result of the second operation key 202 (S122). Then, when the operation of the first operation key 201 ends and the output of the first operation key 201 is off (S123), the processing unit 4 counts the fixed time T0 (S124). When the counting of the fixed time T0 ends, the processing unit 4 validates the operation result of the second operation key 202 (S125). A determination value in the invalid determination processing, that is, whether the operation result of the second operation key 202 is valid or invalid, is represented by a determination flag in the present embodiment.

Figure 13A:
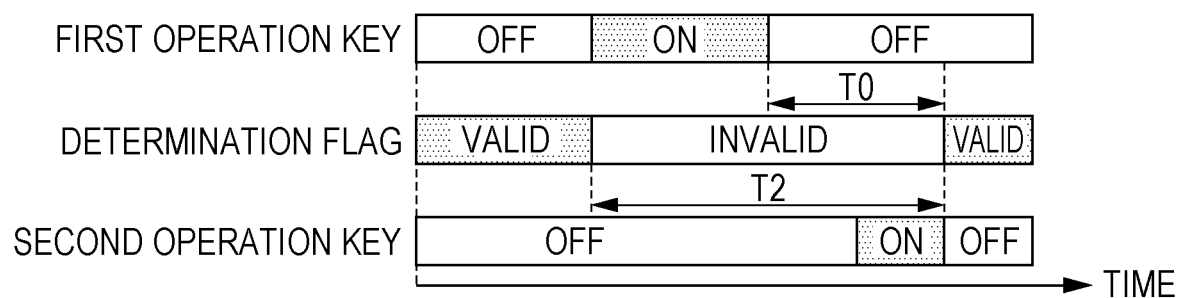
FIGS. 13A and 13B are timing charts depicting an operation of the electronic device.

According to the aforementioned operation of the processing unit 4, for example, as depicted in FIG. 13A, at a time point at which the second operation key 202 has been operated, if the determination flag is "invalid" (that is, if during the invalid period T2), the processing unit 4 invalidates (sets to an off state) the operation result of the second operation key 202. The determination flag is "invalid" not only while the first operation key 201 is being operated but also while the fixed time T0 is elapsing from the ending time point of the operation of the first operation key 201.

Figure 13B:
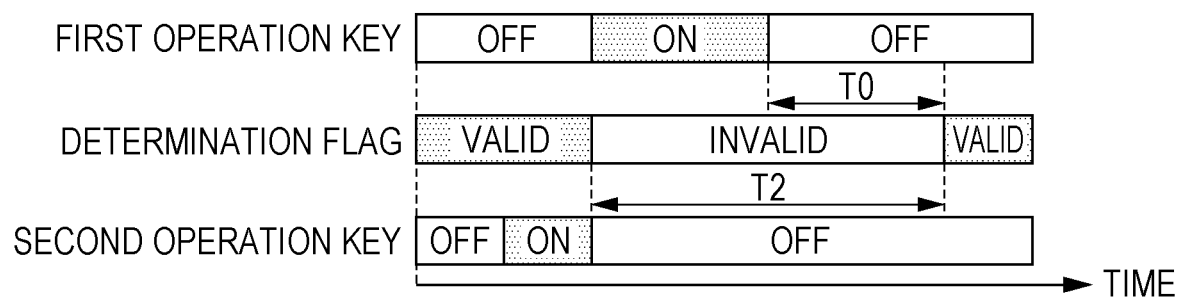

However, for example, as depicted in FIG. 13B, if the second operation key 202 is operated before the start of an operation of the first operation key 201 (that is, before the start of the invalid period T2), the processing unit 4 validates (sets to an on state) the operation result of the second operation key 202. That is, at a time point at which the second operation key 202 has been operated, if the determination flag is "valid", the operation result of the second operation key 202 enters an on state.

According to the configuration of the present embodiment, at a time point at which the second operation key 202 has been operated, even if the first operation key 201 is not necessarily being operated, if the determination flag is "invalid", it is possible for the operation result of the second operation key 202 to be invalidated.

The configuration described in embodiment 2 can be applied as appropriate in combination with the configuration described in embodiment 1 (including modified examples).

Embodiment 3

The electronic device 1 according to the present embodiment is different from the electronic device 1 according to embodiment 2 with regard to the operation of the processing unit 4. Configurations that are similar to those in embodiment 2 are denoted by common reference numbers and descriptions are omitted as appropriate.

In the present embodiment, the processing unit 4 validates the operation result of the second operation key 202 in a case where a state in which the second operation key 202 is being operated has continued for a prescribed time T10 (see FIG. 15) without overlapping the invalid period T2. Furthermore, the processing unit 4 invalidates the operation result of the second operation key 202 in a case where the first operation key 201 has been operated prior to a state in which the second operation key 202 is being operated continuing for the prescribed time T10. That is, the operation result of the second operation key 202 is valid only in a case where a state in which the second operation key 202 is being operated continues for the prescribed time T10 due to the second operation key 202 being pressed for a long time, and the invalid period T2 does not overlap with that duration (the prescribed time T10). As an example, the prescribed time T10 is set in a range from 1.0 seconds or more to 5.0 seconds or less.

Figure 14:
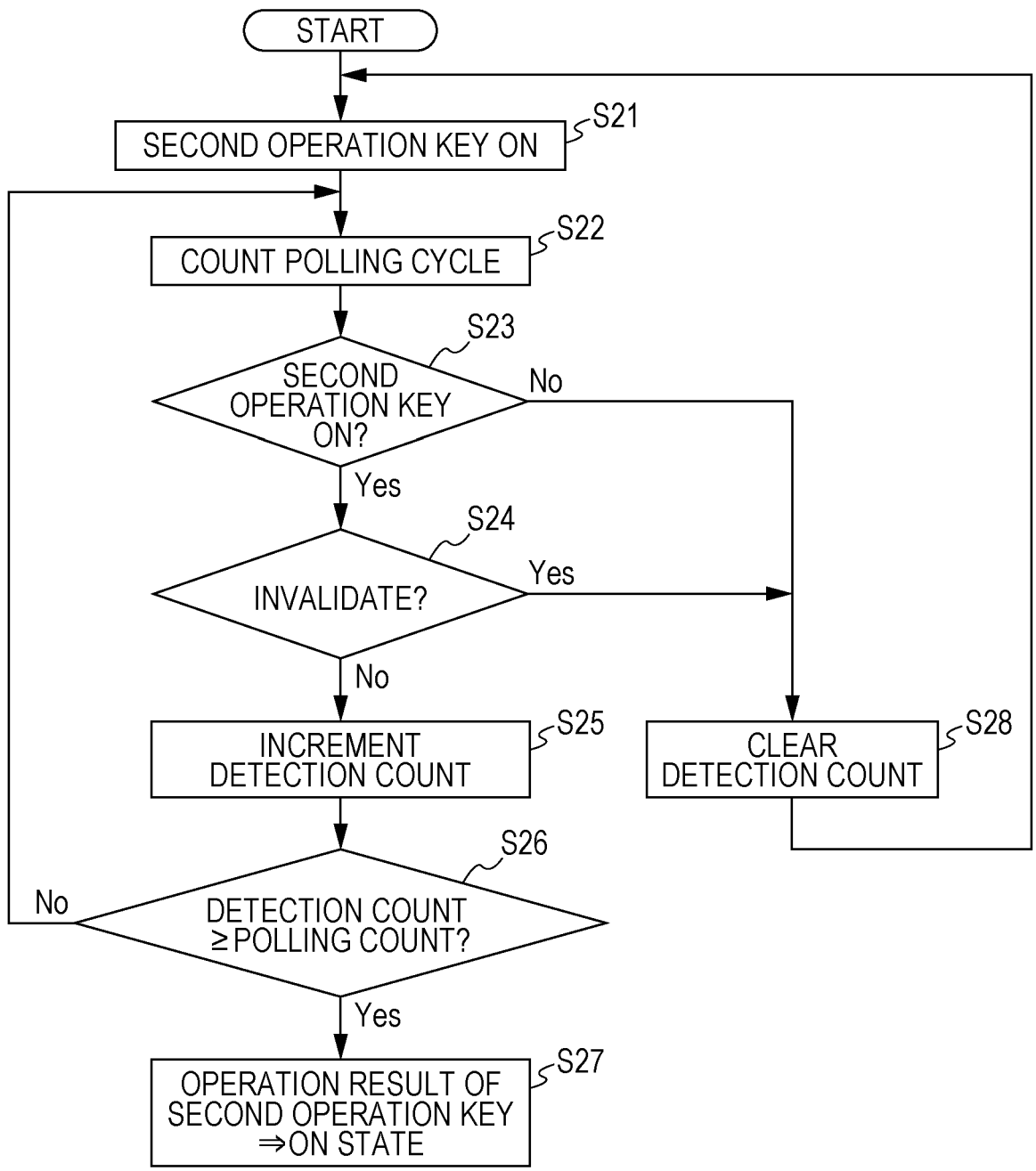
FIG. 14 is a flowchart depicting an operation of an electronic device according to embodiment 3.

Specifically, the processing unit 4 determines an operation result of the second operation key 202 that is output to the control unit 6, in accordance with the flowchart in FIG. 14. In this example, the prescribed time T10 is represented by the product of a polling cycle and a polling count. In other words, when the second operation key 202 is operated and the output of the second operation key 202 is on (S21), the processing unit 4 first counts a prescribed polling cycle (S22), and then determines whether or not the output of the second operation key 202 is on (S23).

At such time, if the second operation key 202 is being operated and the output of the second operation key 202 is on (S23: yes), the processing unit 4 determines whether or not the operation result of the second operation key 202 is to be invalidated (S24). At such time, if the operation result of the second operation key 202 is to be validated (S24: no), the processing unit 4 increments a detection count (S25). Thereafter, the processing unit 4 determines whether or not the detection count is greater than or equal to a prescribed polling count (S26). If the detection count is greater than or equal to the polling count (S26: yes), the operation result is determined in accordance with the output (on) of the second operation key 202 at such time. Thus, the operation result of the second operation key 202 that is input to the control unit 6 is "on state" (S27).

However, if the output of the second operation key 202 is off (S23: no) or the operation result of the second operation key 202 is to be invalidated (S24: yes), the processing unit 4 clears the detection count to "0" (S28), and the processing of the processing unit 4 returns to step S21. In this case, the operation result of the second operation key 202 that is input to the control unit 6 is "off state". Furthermore, if the detection count is less than the polling count (S26: no), the processing of the processing unit 4 returns to step S22.

Regarding whether the operation result of the second operation key 202 used in the determination in step S24 is valid or invalid, the processing unit 4 carries out the determination by means of invalid determination processing similar to that of embodiment 2 (see FIG. 12B).

Figure 15:
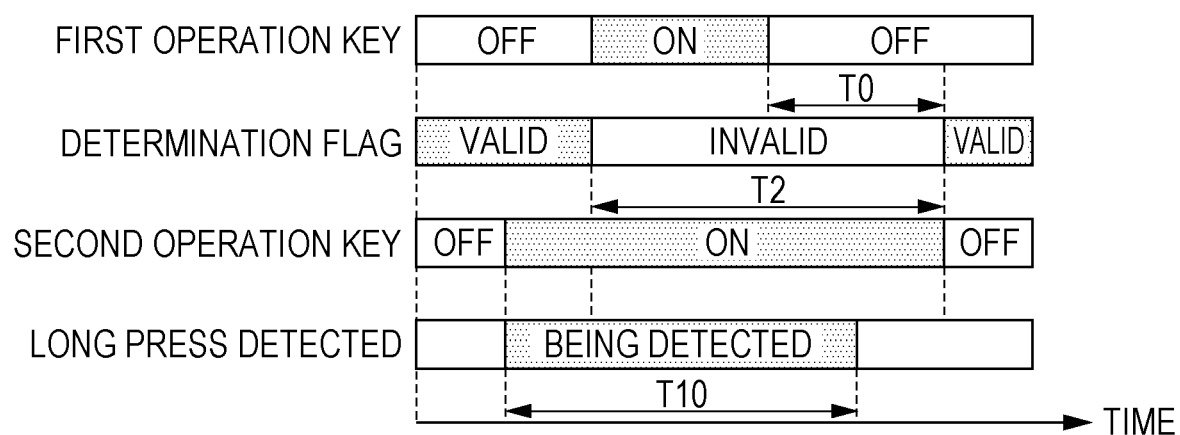
FIG. 15 is a timing chart depicting an operation of the electronic device.

According to the aforementioned operation of the processing unit 4, for example, as depicted in FIG. 15, if the determination flag is "invalid" even temporarily while the second operation key 202 is being pressed for a long time over the prescribed time T10, the processing unit 4 invalidates (sets to an off state) the operation result of the second operation key 202. That is, if the invalid period T2 overlaps a period (the prescribed time T10) in which a long press of the second operation key 202 is detected, the operation result of the second operation key 202 enters an off state.

According to the configuration of the present embodiment, even in a case where the second operation key 202 is operated prior to the first operation key 201, if the first operation key 201 is operated prior to the operation of the second operation key 202 continuing for the prescribed time T10, it is possible for the operation result of the second operation key 202 to be invalidated.

In embodiment 3, in the invalid determination processing, the processing unit 4 employs the invalid period T2 similar to embodiment 2; however, there is no restriction to this example, and the processing unit 4 may employ the invalid period T1 similar to embodiment 1. That is, in the processing unit 4, the invalid period T1 may be a period from the starting time point of an operation of the first operation key 201 to the ending time point of the operation of the first operation key 201.

The configuration described in embodiment 3 (including modified examples) can be applied as appropriate in combination with the configurations described in embodiments 1 and 2 (including modified examples).

(Summary)

As described heretofore, an electronic device (1) according to a first aspect is provided with an operation panel (2), a communication unit (3), and a processing unit (4). The operation panel (2) has a first operation key (201) and a second operation key (202) within a specific region (21). The communication unit (3) is arranged within the specific region (21) of the operation panel (2), and is a location for communicating wirelessly with a mobile terminal (9) that is in a state opposing the specific region (21). The processing unit (4) determines whether an operation result of the second operation key (202) is valid or invalid on the basis of operations of the first operation key (201) and the second operation key (202) in such a way that the operation result of the second operation key (202) is invalidated in a case where the first operation key (201) has been operated.

According to this configuration, even if the mobile terminal (9) or the like touches the second operation key (202) within the specific region (21), the operation result of the second operation key (202) is invalidated if the first operation key (201) within the specific region (21) is being similarly operated. Consequently, it becomes less likely that an erroneous operation of the operation keys (200) will occur.

In an electronic device (1) according to a second aspect, in the first aspect, the first operation key (201), the second operation key (202), and the communication unit (3) may be arranged on one surface side of the operation panel (2).

According to this configuration, it is easy for a user (8) to adopt a posture of holding the mobile terminal (9) over the communication unit (3), in a manner similar to operating the first operation key (201) or the second operation key (202).

In an electronic device (1) according to a third aspect, in the first or second aspect, the operation panel (2) may have a display unit (5) having a rectangular screen (51). The first operation key (201), the second operation key (202), and the communication unit (3) may be arranged along one side of the screen (51).

According to this configuration, the first operation key (201), the second operation key (202), and the communication unit (3) can be arranged in locations that are near the screen (51) compared to a case where the first operation key (201), the second operation key (202), and the communication unit (3) are not along one side of the screen (51).

In an electronic device (1) according to a fourth aspect, in any of the first to third aspects, the second operation key (202) may an operation key (200) for an operation relating to the electrification state of the communication unit (3). The first operation key (201) may be an operation key (200) for an operation other than the operation relating to the electrification state of the communication unit (3).

According to this configuration, it becomes less likely that there will occur an erroneous operation of the operation key (200) for an operation relating to the electrification state of the communication unit (3), and it therefore becomes less likely that a situation will occur such as the electrification of the communication unit (3) stopping during communication between the communication unit (3) and the mobile terminal (9).

In an electronic device (1) according to a fifth aspect, in any of the first to fourth aspects, the first operation key (201) may be arranged on one straight line with the second operation key (202) and the communication unit (3).

According to this configuration, the operation panel (2) can be reduced in size compared to a case where the first operation key (201), the second operation key (202), and the communication unit (3) are not arranged on one straight line.

In an electronic device (1) according to a sixth aspect, in any of the first to fifth aspects, the distance from the communication unit (3) to the first operation key (201) may be shorter than the distance from the communication unit (3) to the second operation key (202).

According to this configuration, it is easy for the mobile terminal (9) or the like to touch the first operation key (201), which is nearer the communication unit (3) than the second operation key (202), and it therefore becomes less likely that an erroneous operation of the second operation key (202) caused by the mobile terminal (9) or the like will occur. Here, in a case where there are a plurality of first operation keys (201), the distance from the communication unit (3) to the first operation keys (201) is the distance to the communication unit (3) from the first operation key (201) that is nearest the communication unit (3) from among the plurality of first operation keys (201).

In an electronic device (1) according to a seventh aspect, in any of the first to sixth aspects, at least one of the first operation key (201) and the second operation key (202) may be an electrostatic capacitive switch.

According to this configuration, at least one of the first operation key (201) and the second operation key (202) does not have moving parts, and therefore malfunctions of the first operation key (201) or the second operation key (202) can be reduced.

In an electronic device (1) according to an eighth aspect, in any of the first to seventh aspects, the processing unit (4) may be configured in such a way that the operation result of the second operation key (202) is invalidated in a case where the second operation key (202) has been operated in an invalid period (T1 or T2). The invalid period (T1 or T2) may be composed of a period from the starting time point of an operation of the first operation key (201) to the ending time point of the operation of the first operation key (201) or a time point that is a fixed time (T0) after the ending time point.

According to this configuration, an operation result of the second operation key (202) can be invalidated while the first operation key (201) is being operated, or from the starting time point of an operation of the first operation key (201) to a fixed time (T0) after the end of the operation.

In an electronic device (1) according to a ninth aspect, in the eighth aspect, the processing unit (4) may validate the operation result of the second operation key (202) in a case where a state in which the second operation key (202) is being operated has continued for a prescribed time (T10) without overlapping the invalid period (T1 or T2). The processing unit (4) may be configured in such a way that the operation result of the second operation key (202) is invalidated in a case where the first operation key (201) has been operated prior to the state in which the second operation key (202) is being operated continuing for the prescribed time (T10).

According to this configuration, even in a case where the second operation key (202) has been operated prior to the first operation key (201), if the first operation key (201) is operated prior to the operation of the second operation key (202) continuing for the prescribed time (T10), the operation result of the second operation key (202) can be invalidated.

An image forming device (100) according to a tenth aspect is provided with an electronic device (1) according to any of the first to ninth aspects, and the electronic device (1) has an image forming function.

According to this image forming device (100), even if the mobile terminal (9) or the like touches the second operation key (202) within the specific region (21), the operation result of the second operation key (202) is invalidated if the first operation key (201) within the specific region (21) is being similarly operated. Consequently, it becomes less likely that an erroneous operation of the operation keys (200) will occur.

A control method for an electronic device (1) according to an eleventh aspect is a control method for the electronic device (1) provided with an operation panel (2), which has a first operation key (201) and a second operation key (202) within a specific region (21), and the communication unit (3). The communication unit (3) is arranged within the specific region (21) of the operation panel (2), and is a location for communicating wirelessly with a mobile terminal (9) that is in a state opposing the specific region (21). In this control method for the electronic device (1), it is determined whether an operation result of the second operation key (202) is valid or invalid on the basis of operations of the first operation key (201) and the second operation key (202) in such a way that the operation result of the second operation key (202) is invalidated in a case where the first operation key (201) has been operated.

According to this control method for the electronic device (1), even if the mobile terminal (9) or the like touches the second operation key (202) within the specific region (21), the operation result of the second operation key (202) is invalidated if the first operation key (201) within the specific region (21) is being similarly operated. Consequently, it becomes less likely that an erroneous operation of the operation keys (200) will occur.

A program according to a twelfth aspect is a program for causing a computer system to execute the control method for the electronic device (1) according to the eleventh aspect.

According to this program, even if the mobile terminal (9) or the like touches the second operation key (202) within the specific region (21), the operation result of the second operation key (202) is invalidated if the first operation key (201) within the specific region (21) is being similarly operated. Consequently, it becomes less likely that an erroneous operation of the operation keys (200) will occur.

There is no restriction to the aforementioned aspects, and the various configurations of the electronic device (1) according to embodiments 1 to 3 (including modified examples) can be realized using a control method for the electronic device (1), a program, a non-transitory recording medium having a program recorded thereon, or the like.

The configurations according to the second to ninth aspects are not configurations that are essential for the electronic device (1) and can be omitted as appropriate.

The present disclosure contains subject matter related to that disclosed in Japanese Priority Patent Application JP 2017-226614 filed in the Japan Patent Office on Nov. 27, 2017, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An electronic device comprising:
   an operation panel that has a first operation key and a second operation key within a specific region;
   a wireless communication circuit that is arranged within the specific region of the operation panel, and is a location for communicating wirelessly with a mobile terminal that is in a state opposing the specific region; and
   a key operation validation circuit that determines whether an operation result of the second operation key is valid or invalid on the basis of operations of the first operation key and the second operation key in such a way that the operation result of the second operation key is invalidated in a case where the first operation key has been operated.

2. The electronic device according to claim 1,
   wherein the first operation key, the second operation key, and the wireless communication circuit are arranged on one surface side of the operation panel.

3. The electronic device according to claim 1,
   wherein the operation panel has a display unit that has a rectangular screen,
   the first operation key, the second operation key, and the wireless communication circuit are arranged along one side of the screen.

4. The electronic device according to claim 1,
   wherein the second operation key is an operation key for an operation relating to an electrification state of the wireless communication circuit, and
   the first operation key is an operation key for an operation other than the operation relating to the electrification state of the wireless communication circuit.

5. The electronic device according to claim 1,
   wherein the first operation key, the second operation key, and the wireless communication circuit are arranged on one straight line.

6. The electronic device according to claim 1,
   wherein a distance from the wireless communication circuit to the first operation key is shorter than a distance from the wireless communication circuit to the second operation key.

7. The electronic device according to claim 1,
   wherein at least one of the first operation key and the second operation key is an electrostatic capacitive switch.

8. The electronic device according to claim 1,
   wherein the key operation validation circuit is configured so as to invalidate the operation result of the second operation key in a case where the second operation key has been operated in an invalid period composed of a period from a starting time point of an operation of the first operation key to an ending time point of the operation of the first operation or a time point that is a fixed time after the ending time point.

9. The electronic device according to claim 8,
   wherein the key operation validation circuit is configured so as to validate the operation result of the second operation key in a case where a state in which the second operation key is being operated has continued for a prescribed time without overlapping the invalid period, and
   invalidate the operation result of the second operation key in a case where the first operation key has been operated prior to the state in which the second operation key is being operated continuing for the prescribed time.

10. An image forming device comprising the electronic device according to claim 1,
    wherein the electronic device has an image forming function.

11. A control method for an electronic device provided with:
    an operation panel that has a first operation key and a second operation key within a specific region; and
    a wireless communication circuit that is arranged within the specific region of the operation panel, and is a location for communicating wirelessly with a mobile terminal that is in a state opposing the specific region,
    the control method comprising:
    determining whether an operation result of the second operation key is valid or invalid on the basis of operations of the first operation key and the second operation key, and
    invalidating the operation result of the second operation key in a case where the first operation key has been operated.

12. A program for causing a computer system to execute the control method for the electronic device according to claim 11.

* * * * *